United States Patent [19]

Marko

[11] Patent Number: 4,800,221

[45] Date of Patent: Jan. 24, 1989

[54] SILICON CARBIDE PRECERAMIC POLYMERS

[75] Inventor: Ollie W. Marko, Carrollton, Ky.

[73] Assignee: Dow Corning Corporation, Midland, Mich.

[21] Appl. No.: 89,119

[22] Filed: Aug. 25, 1987

[51] Int. Cl.$^4$ .............................................. C08G 77/00
[52] U.S. Cl. ........................................ 528/10; 501/88; 528/32; 528/33; 528/34; 528/35; 556/430; 556/431
[58] Field of Search ..................... 528/10, 35, 32, 33, 528/34; 556/430, 431; 501/88

[56] References Cited

U.S. PATENT DOCUMENTS

| | | | |
|---|---|---|---|
| 4,052,430 | 10/1977 | Yajima | 260/448.2 |
| 4,100,233 | 7/1978 | Yajima | 423/345 |
| 4,310,651 | 1/1982 | Baney et al. | 528/21 |
| 4,312,970 | 1/1982 | Gaul | 526/279 |
| 4,340,619 | 7/1982 | Gaul | 427/228 |

OTHER PUBLICATIONS

Vol. 67, Chemical Abstracts, 54,483m (1967).
Vol. 75, Chemical Abstracts, 118,650 p. (1971).

*Primary Examiner*—Melvyn I. Marquis
*Attorney, Agent, or Firm*—James E. Bittell

[57] ABSTRACT

Preceramic polymers composed of [$R_2SiC \equiv CSiR_2$] and, optionally, [$R_2Si$] units are described where R is hydrogen, an alkyl radicals containing 1 to 8 carbon atoms, phenyl radicals, or vinyl radicals. These preceramic polymers may be converted into silicon carbide-containing ceramic materials by pyrolysis at elevated temperatures.

26 Claims, No Drawings

SILICON CARBIDE PRECERAMIC POLYMERS

BACKGROUND OF THE INVENTION

This invention relates to a preceramic polymer composed of

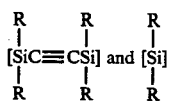

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals. These preceramic polymer contain silicon atoms and carbon atoms (in the form of acetylene groups) in the polymer skeleton. Upon pyrolysis to an elevated temperature these preceramic polymers can be converted to silicon carbide-containing ceramic materials.

Preceramic polycarbosilanes (with [R'$_2$SiCH$_2$] units), perceramic polysilanes (with [R'$_2$Si] and [R'Si] units), and preceramic polysilazanes are well known in the art. These preceramic polymers can be converted into ceramic materials by pyrolysis at elevated temperatures. Example of preceramic polycarbosilanes may be found in Yajima et al. U.S. Pat. Nos. 4,052,430 (Oct. 4, 1977) and 4,100,233 (July 11, 1978) where polycarbosilanes were prepared by thermally decomposing and polycondensing polysilanes. Ceramic materials were then prepared by the pyrolysis of polycarbosilanes in an inert atmosphere or in a vacuum at an elevated temperature. Examples of preceramic polysilanes may be found in Baney et al. U.S. Pat. No. 4,310,651 (issued Jan. 12, 1982) which disclosed a polysilane containing [CH$_3$Si] and [(CH$_3$)$_2$Si] units where there was present 0 to 60 mole percent [(CH$_3$)$_2$Si] units and 40 to 100 mole percent [CH$_3$Si] units and where the remaining bonds on silicon were attached to other silicon atoms and chlorine atoms or bromine atoms. The polysilanes were converted to silicon carbide-containing ceramics at elevated temperatures. Examples of preceramic polysilazanes may be found in Gaul U.S. Pat. Nos. 4,312,970 (issued Jan. 26, 1982) and 4,340,619 (issued July 20, 1982) where preceramic polysilazanes were prepared by reacting either organochlorosilanes and disilazanes or organochlorodisilanes and disilazanes. The preceramic silazane polymers could be converted to ceramic materials by pyrolysis at elevated temperatures. Numerous other examples of these types of preceramic polymers can be found in the patent and open literature.

Chandra and Zank in a copending U.S. patent application entitled "Preceramic Acetylenic Polysilanes" Ser. No. 083,121 filed Aug. 10, 1987, disclose preceramic polysilanes which contain pendant acetylenic groups attached to some of the backbone silicon atoms. The acetylenic groups were not incorporated into the polymer backbone or skeleton of the polysilane. These polysilanes could be converted to ceramic materials by pyrolysis to elevated temperatures.

British Patent No. 914,935 (published Jan. 9, 1963) discloses a method of preparing polymeric materials containing [(R"$_2$)SiC≡C] units by reacting an organic difluorosilane of formula R"$_2$SiF$_2$ with an alkali metal acetylide. The polymers produced were used as lubricants, catalysts, and additives for plastics, varnishes, and oils.

British Patent Application No. 8,709,296 (filed Apr. 16, 1987) prepared polymeric materials containing [(R'''$_2$)SiC≡C] units by reacting diethynyl silanes of formula R'''$_2$Si(C≡CH)$_2$ with an alkyl lithium salt to obtain the lithium salt of the diethynyl silane and then reacting the lithium salt with a dihalogensilane of formula R'''$_2$SiX*$_2$ where each R''' is independently selected from hydrogen or an alkyl or aryl group containing 1 to 18 carbon atoms and where X* is a halogen atom. Suggested uses include semiconductor, photoconductor, and optical waveguide applications.

More recently, Seyferth, at the Eighth International Symposium on Organosilicon Chemistry held at St. Louis, Mo. on June 7–12, 1987, disclosed preceramic polymers containing [(CH$_3$)R$^{iv}$SiC≡C] units where R$^{iv}$ is hydrogen, methyl, or vinyl. These preceramic polymers were prepared by reacting acetylene Grignard with an organosilane of formula (CH$_3$)R$^{iv}$SiCl$_2$. The preceramic polymers could be converted to ceramic materials in about 60 to 85 weight percent by pyrolysis to elevated temperatures.

The preceramic polymers of the present invention containing

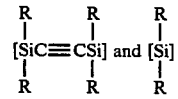

units, where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals, appear to be novel compositions of matter. Such preceramic polymers are useful in preparing ceramic materials by pyrolysis at elevated temperatures.

THE INVENTION

This invention relates to a preceramic polymer composed of

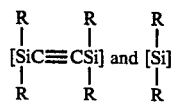

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals.

This invention also relates to a method of preparing a preceramic polymer composed of

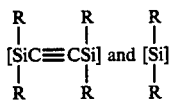

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals, said method consisting of reacting under anhydrous conditions in solution a mixture containing 0 to 25 mole percent of a silane of formula R$_2$SiX$_2$ and 75 to 100 mole percent of acetylenic compound of formula R$_2$XSiC≡CSiXR$_2$ where each R is independently selected from the group consisting of hydrogen, alkyl radicals containing 1 to 8 carbon atoms, phenyl radicals, and vinyl radicals and X is chlorine or bromine in the presence of a metal selected from the group consisting of lithium, sodium, and potassium.

The invention further relates to a method of preparing a silicon carbide-containing ceramic material, which method consists of heating a preceramic polymer to at least 800° C. in an inert atmosphere or in a vacuum until the preceramic polymer is converted into a silicon carbide-containing material where the preceramic polymer is composed of

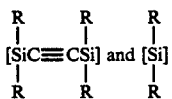

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals.

The preceramic polymer of this invention contains 75 to 100 mole percent.

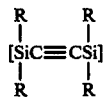

and 0 to 25 mole percent

units where each R is independently selected from the group consisting of hydrogen, alkyl radicals containing 1 to 8 carbon atoms, phenyl radicals, and vinyl radicals. Therefore, the backbone of the preceramic polymers of this invention will contain Si—C, C≡C, and Si—Si bonds. Examples of suitable R radicals include hydrogen atoms and methyl, ethyl, propyl, butyl, pentyl, hexyl, heptyl, octyl, phenyl, and vinyl groups. The preferred R radical is methyl. The R radicals may be the same or they may be different. For example, the majority of the R radicals in the preceramic polymer may be methyl with one or more of the other listed R radicals groups present in lesser amounts. The preceramic polymers of the present invention are generally solids. The presence of [R$_2$Si] units generally allows for the softening or melting point of the preceramic polymer to be increased. The [R$_2$Si] units may be used to incorporate controlled amounts of other R radicals (where, for example, the R radicals in the acetylene-containing units are methyl) in order to tailor a given preceramic polymer for a specific use. Selection of various R radicals to be incorporated into the preceramic polymers allows for control of the silicon/carbon ratio. Generally, preceramic polymers containing 90 to 100 mole percent [R$_2$SiC≡CSiR$_2$] units and 0 to 10 mole percent [R$_2$Si] units are preferred.

The preceramic polymers of this invention can be prepared via the sodium metal coupling reaction of a 1,4-disilyl-2-butyne of formula R$_2$XSiC≡CSiXR$_2$ where each R is independently selected from the group consisting of hydrogen, alkyl radicals containing 1 to 8 carbon atoms, phenyl radicals, and vinyl radicals and X is halogen. The resulting preceramic polymer will contain [R$_2$SiC≡CSiR$_2$] units. Other preceramic polymers of this invention can be prepared via the sodium metal coupling reaction of a mixture of a 1,4-disilyl-2-butyne of formula R$_2$XSiC≡CSiXR$_2$ and a silane of formula R$_2$SiX$_2$ where each R is independently selected from the group consisting of hydrogen, alkyl radicals containing 1 to 8 carbon atoms, phenyl radicals, and vinyl radicals and X is a halogen. Preferably, X is chlorine or bromine and most preferably X is chlorine. The relative amounts of 1,4-disilyl-2-butyne and silane in the reaction mixture should be selected to obtain the desired molar percentages of units in the preceramic polymers. Normally the reaction mixture contains 0 to 25 mole percent of the silane and 75 to 100 mole percent of the 1,4-disilyl-2-butyne. Preferably, the reaction mixture contains 0 to 10 mole percent of the silane and 90 to 100 mole percent of the 1,4-disilyl-2-butyne. The sodium coupling reaction takes place in an organic solvent solution of the silane and butyne monomers. It is generally preferred that the refluxing temperature of the solvent or solvent mixture is greater than the melting point of sodium (about 98° C.). One preferred reaction solvent is a 7 to 1 (weight to weight) mixture of toluene and tetrahydrofuran which has a boiling point of about the melting point of sodium. The coupling reaction may also be carried out using other alkaline metals such as lithium or potassium; sodium is, however, preferred.

The 1,4-disilyl-2-butynes are known materials and can be prepared by conventional methods known in the art. For example, an acetylene Grignard reagent of formula X'MgC≡CMgX', where X' is chlorine, bromine, or iodine, or dilithium acetylide (LiC≡CLi) may be reacted with a saline of formula R$_2$SiX$_2$, where R and X are as described above, to obtain the desired 1,4-disilyl-2-butyne. Mixtures of silanes may be used to obtain 1,4-disilyl-2-butynes with different R groups as desired. For best results, dry reaction conditions should be observed. The reaction can take place using conventional organic solvents. Examples of useful solvents include toluene, xylene, benzene, tetrahydrofuran and ethers as well as solvent mixtures. Specifically, tetrahydrofuran is preferred for reactions with acetylene Grignard and toluene is preferred for reactions with lithium acetylide. The reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reactants is complete, the reaction mixture is stirred for a time, with or without heating, to ensure the completion of the reaction. Typically the reaction is carried out for a time period of about 1 to 48 hours. Excess Grignard reagent or lithium compound, if any, may be destroyed using water, HCl, or an alcohol. The reaction mixture is cooled to room temperature and then filtered by convention means and the solvents and other volatile materials are then removed by stripping under vacuum with the addition of heat. Other separating techniques will be apparent to those skilled in the art. It is not required that all solvent be removed prior to the polymerization step. The acetylene Grignard reagent or lithium acetylide can be prepared by conventional methods known in the art.

The preceramic polymers of this invention may be converted to ceramic materials by pyrolysis to elevated temperatures. The preceramic polymer is fired to an elevated temperature of at least 750° C. in an inert atmosphere or vacuum until the perceramic polymer is converted to a ceramic material. Preferably the pyrolysis temperature is from about 1000° to 1300° C. If the preceramic polymer is of sufficient viscosity or if it possesses a sufficiently low melt temperature, it can be shaped, rendered infusible, and then finally pyrolyzed to give a ceramic shaped article such as a fiber. The shaped article may be rendered infusible by various crosslinking reactions including, but not limited to, thermal reactions, oxidative reactions, and the like. Preferably the perceramic polymers used in the practice of this invention have softening temperatures of about 50° to 300° C. and most preferably in the range of 70° to 200° C. Such a softening temperature allows for the formation of preceramic fibers by known spinning techniques. The perceramic polymers of this invention may also be used to prepare silicon carbide containing ceramic materials such as films, powders, coatings, composites, and other shaped articles. They may be used as binders and infiltrants in the production of various ceramic materials.

So that those skilled in the art can better appreciate and understand the invention, the following examples are given. These examples are not intended to limit the invention. Unless otherwise indicated, all percentages are by weight. Unless otherwise indicated, all procedures were carried out in an inert atmosphere (generally argon) or under a vacuum.

EXAMPLE 1

Preparation of 1,2-bis(dimethylchlorosilyl)ethyne.

A five-liter, three-neck flask equipped with an argon purge was charged with magnesium metal (109 g, 4.46 moles). Ethyl bromide (477 g, 4.28 moles) in tetrahydrofuran (600 ml) was slowly added. The reaction started immediately; the reaction mixture was cooled using two 30 psig air hoses directed at the outside of the reaction flask. After the addition was complete, an additional 1450 ml of tetrahydrofuran was added and the reaction mixture heated to 55° C. for 20 hours. Acetylene was slowly bubbled through the reaction mixture for about 3.5 hours with cooling as required to keep the reaction temperature near room temperature. The acetylene had been purified by passage through two dry ice/isopropanol baths and a 1 by 24 inch Drierite column. The reaction mixture became extremely viscous during the acetylene addition so an additional 800 ml of tetrahydrofuran was added. The reaction mixture was stirred overnight at room temperature and then slowly added to dimethyldichlorosilane (1130 g, 8.76 moles) under an argon atmosphere. Cooling was again provided by air directed at the reaction vessel. After stirring overnight at room temperature, the reaction mixture was filtered and then stripped distilled to remove the tetrahydrofuran and excess dimethyldichlorosilane. The product was isolated using a three-foot spinning band column (b.p. 51° to 52° C. at 3 mm Hg; literature: 67° C. at 11.5 mm Hg). Mass spectrometry confirmed the product as 1,2-bis(dimethylchlorosilyl)ethyne.

EXAMPLE 2

Preparation of poly(1,1,4,4-tetramethyl-1,4-disila-2-butyne.

A two-liter, three-neck flask was charged with a seven-to-one (weight/weight) mixture of toluene and tetrahydrofuran and sodium metal (6.7 g, 0.291 moles) under an argon atmosphere. The boiling point of this solvent mixture is the same as the melting point of the sodium metal. The solvent mixture was heated to reflux to melt the sodium and 1,2-bis(dimethylchlorosilyl)ethyne (29.3 g, 0139 moles) was slowly added. The reaction mixture was refluxed overnight. After cooling to room temperature, excess sodium was neutralized by dropwise addition of water. The mixture was filtered and then washed with water and then with acetone to remove metal chloride salt from any insoluble polymer formed during the reaction. No measurable amount of insoluble polymer was observed. Because highly crosslinked polymers are generally intractable, the lack of any insoluble polymer suggests that the sodium coupling reaction did not crosslink the acetylene moiety. After removing about 60 weight percent of the solvent the remaining reaction mixture was added to methanol (the volume ratio of methanol to the reaction mixture was about five to one). The resulting white polymer precipitate was centrifuged after which the solvent was removed by vacuum distillation (200° C. at <0.5 mm Hg). A waxy white polymer product was obtained. The infrared spectrum (KBr pellet) was consistent with a polymer containing [(CH$_3$)$_2$SiC≡CSi(CH$_3$)$_2$] units: 1960, 2900, 1400, 1250, and 790 cm$^{-1}$ assigned to SiCH$_3$ and Si(CH$_3$)$_2$; 840, 790, and 730 cm$^{-1}$ assigned to Si—C; and 2100 cm$^{-1}$ assigned to C≡C.

EXAMPLE 3
Pyrolysis of poly(1,1,4,4-tetramethyl-1,4-disila-2-butyne.

Two polymer samples (about 1 g each) were placed in alumina boats which were inside an alumina tube and then fired to 1200° C. at a rate of 30° C./min under an argon atmosphere in a Lindberg tube furnace (model 59744-A). The flowrate of argon through the alumina tube was essentially one-third tube volume per minute. Ceramic materials were obtained (44 and 46 weight percent ceramic yields, respectively). The oxygen level of one sample was 2.4 weight percent.

One ceramic sample was further heated to 1500° C. under argon and held for two hours. This ceramic material had an additional weight loss of 2.9 weight percent and contained 48.2 weight percent silicon, 49.7 weight percent carbon, and 0.88 weight percent oxygen. X-ray diffraction showed a weak, very broad crystalline peak near where SiC is normally observed; the mass absorption coefficient was 28.4.

EXAMPLE 4
Oxidation of ceramic material.

A 0.360 g sample of the ceramic material produced in Example 3 was heated to 1200° C. in still air for 12 hours. The sample lost 0.6 weight percent of its original weight. The oxygen content increased to 3.9 weight percent oxygen.

That which is claimed:

1. A preceramic polymer composed of

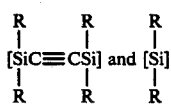

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals.

2. A perceramic polymer as defined in claim 1 where there are present 0 to 10 mole percent [R$_2$Si] units and 90 to 100 mole percent [R$_2$SiC≡CSiR$_2$] units.

3. A perceramic polymer as defined in claim 2 where there are present 100 mole percent [R$_2$SiC≡CSiR$_2$] units.

4. A perceramic polymer as defined in claim 1 where R is methyl.

5. A perceramic polymer as defined in claim 2 where R is methyl.

6. A perceramic polymer as defined in claim 3 where R is methyl.

7. A preceramic polymer as defined in claim 1 where the preceramic polymer has a softening temperature of 50° to 300° C.

8. A preceramic polymer as defined in claim 2 where the perceramic polymer has a softening temperature of 50° to 300° C.

9. A preceramic polymer as defined in claim 3 where the preceramic polymer has a softening temperature of 50° to 300° C.

10. A method of preparing a preceramic polymer composed of

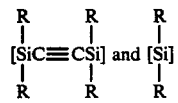

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals, said method consisting of reacting under anhydrous conditions in solution a mixture containing 0 to 25 mole percent of a silane of formula R$_2$SiX$_2$ and 75 to 100 mole percent of acetylenic compound of formula R$_2$XSiC≡CSiXR$_2$ where each R is independently selected from the group consisting of hydrogen, alkyl radicals containing 1 to 8 carbon atoms, phenyl radicals, and vinyl radicals and X is halogen in the presence of a metal selected from the group consisting of lithium, sodium, and potassium.

11. A method as defined in claim 10 where the metal is sodium and X is chlorine or bromine.

12. A method as defined in claim 10 where the mixture contains 0 to 10 mole percent of a silane of formula R$_2$SiX$_2$ and 90 to 100 mole percent of acetylenic compound of formula R$_2$XSiC≡CSiXR$_2$ and X is chlorine or bromine.

13. A method as defined in claim 11 where the mixture contains 0 to 10 mole percent of a silane of formula R$_2$SiX$_2$ and 90 to 100 mole percent of acetylenic compound of formula R$_2$XSiC≡CSiXR$_2$.

14. A method as defined in claim 12 where the mixture contains 100 mole percent of acetylenic compound of formula R$_2$XSiC≡CSiXR$_2$.

15. A method as defined in claim 13 where the mixture contains 100 mole percent of acetylenic compound of formula R$_2$XSiC≡CSiXR$_2$.

16. A method as defined in claim 10 where R is methyl.

17. A method as defined in claim 13 where R is methyl.

18. A method as defined in claim 15 where R is methyl.

19. A method as defined in claim 10 where the preceramic polymer has a softening temperature of 50° to 300° C.

20. A method of preparing a silicon carbide-containing ceramic material, which method consists of heating a preceramic polymer to at least 750° C. in an inert atmosphere or in a vacuum until the preceramic polymer is converted into a silicon carbide-containing ceramic material where the preceramic polymer is composed of

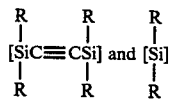

units where there are present 0 to 25 mole percent [R$_2$Si] units and 75 to 100 mole percent [R$_2$SiC≡CSiR$_2$] units and where each R is independently selected from the group consisting of hydrogen, alkyl radicals containing 1 to 8 carbon atoms, phenyl radicals, and vinyl radicals.

21. A method as defined in claim 20 where in the preceramic polymer there are present 0 to 10 mole percent [R$_2$Si] units and 90 to 100 mole percent [R$_2$SiC≡CSiR$_2$] units.

22. A method as defined in claim 20 where in the preceramic polymer there are present 100 mole percent [R$_2$SiC≡CSiR$_2$] units.

23. A method as defined in claim 20 where R is methyl.

24. A method as defined in claim 21 where R is methyl.

25. A method as defined in claim 22 where R is methyl.

26. A method as defined in claim 20 where the preceramic polymer has a softening temperature of 50° to 300° C.

* * * * *